(12) United States Patent
Gertzmann et al.

(10) Patent No.: US 6,710,120 B2
(45) Date of Patent: Mar. 23, 2004

(54) POLYURETHANE DISPERSIONS BASED ON FATTY ACID DIALKANOLAMIDES

(75) Inventors: Rolf Gertzmann, Leverkusen (DE); Christoph Irle, Sant Just Desvern (ES); Jan Weikard, Odenthal (DE); Rolf Roschu, Castelldefels (ES); Erhard Lühmann, Bomlitz (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/403,222

(22) Filed: Mar. 31, 2003

(65) Prior Publication Data

US 2003/0191273 A1 Oct. 9, 2003

(30) Foreign Application Priority Data

Apr. 5, 2002 (DE) .......................................... 102 15 053

(51) Int. Cl.$^7$ .................... C09D 175/04; C09D 175/08; C08J 3/03; C08G 18/32; C08G 18/38
(52) U.S. Cl. ...................... 524/591; 524/839; 524/840; 528/49; 528/71; 528/75; 528/85; 525/123; 525/131
(58) Field of Search ................................. 524/591, 839, 524/840; 525/123, 131; 528/49, 71, 75, 85

(56) References Cited

U.S. PATENT DOCUMENTS

| | | | | |
|---|---|---|---|---|
| 4,257,995 A | * | 3/1981 | McLaughlin et al. | 264/122 |
| 4,257,996 A | * | 3/1981 | Farrissey, Jr. et al. | 264/122 |
| 4,277,380 A | | 7/1981 | Williams et al. | 524/591 |
| 5,004,779 A | | 4/1991 | Blum et al. | 524/591 |
| 5,039,732 A | | 8/1991 | Arora | 524/591 |
| 5,104,737 A | * | 4/1992 | Arora | 428/423.1 |
| 5,252,696 A | | 10/1993 | Laas et al. | 528/49 |
| 5,589,535 A | | 12/1996 | Schwab et al. | 524/591 |

FOREIGN PATENT DOCUMENTS

| | | |
|---|---|---|
| CA | 2148550 | 10/1995 |
| DE | 199 30 961 | 1/2001 |
| EP | 0 709 414 | 6/1999 |
| JP | 6-340842 | 12/1994 |
| WO | 97/19120 | 5/1997 |

OTHER PUBLICATIONS

J. Amer. Oil Chem. Soc., 48, Nov. 1971, pp. 758–763, K.T. Achaya, "Chemical Derivatives Of Castor Oil".

* cited by examiner

*Primary Examiner*—Rabon Sergent
(74) *Attorney, Agent, or Firm*—Joseph C. Gil; Thomas W. Roy

(57) ABSTRACT

The invention relates to aqueous polyurethane dispersions based on fatty acid dialkanolamides, to a process for preparing them and to use as coating compositions.

20 Claims, No Drawings

POLYURETHANE DISPERSIONS BASED ON FATTY ACID DIALKANOLAMIDES

BACKGROUND OF THE INVENTION

The invention relates to aqueous polyurethane dispersions based on fatty acid dialkanolamides, to a process for preparing them and to use as coating compositions.

With the aim of lowering the emissions of organic solvents, aqueous coating compositions are increasingly being used in place of solvent-borne systems. An important class of aqueous film-forming binders are the polyurethane dispersions. An overview is given by D. Dieterich, Prog. Org. Coatings 9, 281 (1981). Polyurethane dispersions unite the important properties of resistance to chemicals and to mechanical loads. Especially in the field of the coating of surfaces under high mechanical stress, therefore, the use of polyurethane dispersions is of advantage.

Of particular interest is the resistance to damage caused by the heels of shoes on flooring coatings (heelmark resistance). Particularly in the case of coatings with pronounced thermoplasticity, such heelmarks lead to permanent damage. The resistance to such damage can be improved by crosslinking the floor coating.

One way of achieving such an improvement in the profile of properties is to use hydrophilicized polyisocyanates, as described, for example, in EP-A 0 540 985. Aqueous two-component (2K) polyurethane coating materials attain a very high level of properties. Owing to the comparatively complicated application technique of 2K coating systems, their field of use is limited, particularly in the case of manual application.

A simple, prior-art route to the production of crosslinked coatings from polyurethane dispersions is the incorporation of unsaturated units into the binder (Advances in Urethane Science and Technology, K. C. Frisch, D. Klempner (eds.) Vol. 10, pp. 121–162 (1987)). Coatings comprising such binders crosslink through reaction with atmospheric oxygen (autoxidative crosslinking). In comparison to the combination of a polyurethane dispersion with a hydrophilicized polyisocyanate, the application, in particular, of these binders, which are processed as a single component, is simplified.

Dispersions comprising urethane groups and air-drying components are also described in EP-A 0 017 199, EP-A 0 379 007, WO-A 97/19120, DE-A 4 004 651, DE-A 4 416 336 and JP-A 6 340 842. A disadvantage of the autoxidatively crosslinkable polyurethane dispersions known to date, however, is that the mechanical properties of the coating film do not match the high level of the purely physically drying polyurethane dispersions. This is evident, for example, in a poorer abrasion resistance.

U.S. Pat. No. 5,039,732 describes oxidatively drying polyurethane dispersions which comprise fatty acid diethanolamides, prepared from diethanolamine and fatty acids or fatty acid derivatives of semi-drying and/or drying oils such as linseed oil or soya oil as the diol component. The preparation of these products leads, via intermediates of very high viscosity, to dispersions which are in turn of high viscosity, and which at solids contents greater than 30% by weight are no longer fluid at room temperature and therefore cannot be applied as a thin, homogeneous film to a substrate.

Another process for preparing polyurethane dispersions comprising unsaturated units is described in EP-A 0 709 414. Through the use of dehydrated castor oil as the sole OH component or as part of the polyol mixture in the preparation of a polyurethane dispersion, products having a defined C=C double bond content are obtained.

In the dehydration of castor oil (see, for example, K. T. Achaya, J. Am. Oil Chem. Soc. 48, p. 758 [1971]) the elimination of each molecule of water produces one C=C double bond. Accordingly, the process described in EP-A 0 709 414 is limited to the effect that dehydration of castor oil having a defined OH group content and double bond content gives products having always the same total number of hydroxyl groups and double bonds. Thus it is not possible by this process, for example, to prepare products having a high double bond content and a high OH group content at the same time.

DE-A 199 30 961 describes coatings of good heelmark resistance which comprise transesterification products of castor oil and drying/semi-drying oils. Nevertheless, for certain applications, where (König) pendulum hardnesses of more than 90 sec are called for, the products have inadequate gloss and/or relatively poor film-forming properties.

It was an object of the present invention to provide polyurethane dispersions which are easy to pigment and possess good film forming properties. At the same time, the intention was that the coatings produced from these dispersions should have sufficient pendulum hardness, preferably above 90 sec, and also good heelmark resistance and high gloss.

DESCRIPTION OF THE INVENTION

Surprisingly it has been possible to achieve the above-noted object by the provision of polyurethane dispersions which contain saturated fatty acid dialkanolamides incorporated into the polymer chains. These dispersions can be processed to particularly high-grade floor coatings if unsaturated, oxidatively drying fatty acids are also included. Besides high resistance to water-ethanol mixtures and good heelmark resistance, such products can have pendulum hardnesses of at least 90 sec (according to König).

The present invention provides aqueous polyurethane dispersions prepared by dispersing a polymer product with water, where the polymer product is prepared by reacting a reaction mixture comprising:

A) at least one condensation product of (i) an oxidatively non-drying fatty acid and (ii) a dialkanolamine and having a number average molecular weight of <500, B) one or more polyisocyanates, C) one or more hydrophobic, water immiscible polyols having a number average molar weight of from 500 to 6000 and containing no functional groups being capable of oxidative drying, D) one or more compounds which contain an ionic group or a group capable of forming an ionic group, and E) one or more polyols and/or polyamines having a number average molecular weight of <500.

Where appropriate, the reaction mixture may also include monoalcohols and/or monoamines (F) and/or OH- or NH-functional, nonionically hydrophilic polyoxyalkylene ethers (G).

In one preferred embodiment the reaction mixture includes a further component (H) which, in addition to at least one group capable of oxidative drying, contains at least one group which is reactive towards isocyanates.

The reaction mixture comprises from 0.5 to 30% by weight, preferably from 1 to 25% by weight and with particular preference from 2 to 20% by weight of component (A), from 5 to 60% by weight, preferably from 15 to 57% by weight and with particular preference from 25 to 55% by weight of component (B), from 0.5 to 65% by weight, preferably from 2 to 55% by weight and with particular preference from 5 to 50% by weight of component (C), from 0.5 to 15% by weight, preferably from 2 to 14% by weight and with particular preference from 4 to 12% by weight of component (D), from 0.5 to 18% by weight, preferably from 2 to 12% by weight and with particular preference from 4 to 10% by weight of component (E), and from 0 to 10% by weight, preferably from 0 to 7% by weight and with particular preference from 0 to 2% by weight of component (F) and/or from 0 to 10% by weight, preferably from 0 to 7% by weight and with particular preference from 0 to 2% by weight of component (G), the percentages being based on the weight of the resin solids and adding up to 100% by weight.

In the case where component (H) is also included in the reaction mixture, the reaction mixture comprises from 0.5 to 20% by weight, preferably from 1 to 15% by weight and with particular preference from 1.5 to 10% by weight of component (A), from 5 to 60% by weight, preferably from 20 to 57% by weight and with particular preference from 30 to 55% by weight of component (B), from 0.5 to 20% by weight, preferably from 2 to 18% by weight and with particular preference from 3 to 15% by weight of component (C), from 0.5 to 10% by weight, preferably from 2 to 8% by weight and with particular preference from 2.5 to 6.5% by weight of component (D), from 0.5 to 20% by weight, preferably from 2 to 14% by weight and with particular preference from 4 to 10% by weight of component (E), and from 0 to 10% by weight, preferably from 0 to 5% by weight and with particular preference from 0 to 2% by weight of component (F) and/or from 0 to 10% by weight, preferably from 0 to 5% by weight and with particular preference from 0 to 2% by weight of component (G) and from 5 to 35% by weight, preferably from 10 to 30% by weight, with particular preference from 20 to 28% by weight of a component (H) which besides at least one group capable of oxidative drying also contains at least one, preferably on average two, isocyanate-reactive group(s), the percentages being based on the weight of the resin solids and adding up to 100% by weight.

Examples of compounds (A) are products obtained by condensing (i) oxidatively non-drying fatty acids or fatty acid mixtures with (ii) dialkanolamines.

Suitable compounds (i) include linear or branched $C_6$–$C_{24}$ fatty acids which can be obtained from non-drying oils. Non-drying oils are those which even after a very long time shown no propensity to film, i.e. they remain permanently liquid. The iodine number of such non-drying oils is around or below 100. Where appropriate, these fatty acids may also contain functional groups which—at between 0 and 100° C.—are not reactive towards isocyanates under the chosen reaction conditions, such as epoxides, for example. The preparation of epoxidized fatty acid derivatives is described in G. Dieckelmann, The basics of industrial Oleochemistry, Oleochemical consulting Int., Mülheim, 1988 (pp. 133–144).

Examples of non-drying oils and, respectively, of their fatty acids include, for example, behenic acid, arachidic acid, oleic acid, stearic acid, palmitic acid, coconut oil fatty acid, groundnut oil fatty acid, olive kernel oil fatty acid, olive oil fatty acid, almond oil acid, kapok oil acid, hazelnut oil acid, apricot kernel oil acid, palm kernel oil fatty acid, palm oil fatty acid or mixtures of these fatty acids. Particularly preferred compounds (i) are those obtainable from natural vegetable oils or animal oils, such as coconut oil fatty acid, groundnut oil fatty acid, olive kernel oil fatty acid, olive oil fatty acid, almond oil acid, kapok oil acid, hazelnut oil acid, apricot kernel oil acid, palm kernel oil fatty acid or palm oil fatty acid or mixtures of these.

Suitable dialkoanolamines (ii) include compounds of the general formula (I)

$$\text{HO—R—NH—R'—OH} \tag{I}$$

wherein R and R' stand for identical or different $C_2$–$C_9$ alkyl and/or aralkyl radicals.

Examples of compounds of the formula (I) include 2-[(hydroxyethyl)amino]-2-methylpropan-1-ol, 1-(2-hydroxyethylamino)-2-propanol or N-2-hydroxyethylnorephedrines. Preferred dialkoanolamines (ii) of the formula (I) are those which have identical alkyl radicals R and R', such as bis(2-hydroxyethyl)amine, bis(2-hydroxypropyl)amine, 1,1'-dimethyl-1-1-dipropyl-2,2'iminodiethanol and 3,3'-diallyloxy-2,2'-dihydroxydipropyl-amine. Particular preference is given to bis(2-hydroxyethyl)amine.

Particular preference as component (A) is given to condensation products of coconut oil fatty acid and bis(2-hydroxyethyl)amine (available commercially as Rewomid® DC 212 S, Tego Chemie, Essen, Germany) and also of oleic acid and bis(2-hydroxyethyl)amine (available commercially as Comperlan® OD, Cognis, Düsseldorf, Germany) and also mixtures of the two.

The polyisocyanates used in polyurethane chemistry are suitable as component (B). Preference is given to diisocyanates of formula $R^1(NCO)_2$, where $R^1$ stands for an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms or an araliphatic hydrocarbon radical having from 7 to 15 carbon atoms. Examples of preferred diisocyanates of this kind are tetramethylene diisocyanate, hexamethylene diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetra-methyl-m- or p-xylylene diisocyanate, 1-isocyanato-3,3,5-trimethyl-5-isocyanatomethylcyclohexane (isophorone diisocyanate), 4,4'-diisocyanatodicyclohexylmethane, and also mixtures of the said diisocyanates. Particularly preferred diisocyanates are 1-isocyanato-3,3,5-trimethyl-5-isocyanatomethylcyclohexane (isophorone diisocyanate) and 4,4'-diisocyanatodicyclohexylmethane and also mixtures of these two diisocyanates.

It is likewise possible to use isocyanates with a functionality, for example, of three and/or more, in order thus to ensure a certain degree of branching or crosslinking in the polyurethane. Isocyanates of this kind are obtained, for example, by reacting difunctional isocyanates with one another in such a way that some of their isocyanate groups are derivatized to form isocyanurate, biuret, allophanate, uretdione or carbodiimide groups. Also suitable are polyisocyanates of this kind which are hydrophilicized by way of nonionic and/or ionic groups, such as are customarily used as crosslinkers in aqueous 2K PU coating materials. Examples of such isocyanates are described in EP-A 510 438, where polyisocyanates are reacted with OH-functional carboxyl compounds. Hydrophilicized polyisocyanates are also obtained by reacting polyisocyanates with compounds which are reactive towards isocyanates and which carry sulphuric-acidic groups; these are described, for example, in EP-A 0 703 255. Polyisocyanates of this kind may have high functionalities, of more than 3, for example.

Suitable polyols (C) in the molar weight range from 500 to 6000, preferably from 500 to 3000 and with particular preference from 650 to 2500 are those customarily used for preparing polyurethanes. They have an OH functionality of at least 1.8 to 5, preferably from 1.9 to 3 and with particular preference from 1.9 to 2.0. They comprise, for example, polyesters, polyethers, polycarbonates, polyestercarbonates, polyacetals, polyolefins, polyacrylates and polysiloxanes. Preference is given to using polyesters, polyethers, polyestercarbonates and polycarbonates. Particular preference is given to bifunctional polyesters, polyethers, polyestercarbonates and polycarbonates. Mixtures of the polymeric polyols (C) described are likewise suitable.

Further suitable polyols (C) are those containing acrylic ester and/or methacrylic ester units—referred to below as (meth)acrylates. Polyurethane dispersions prepared using such (meth)acrylates are then suitable as part of coatings which are curable by radiation, preferably by ultraviolet (UV) radiation.

It is preferred to use hydroxyl-containing polyester (meth) acrylates having an OH content of from 30 to 300 mg KOH/g, preferably from 60 to 130 mg KOH/g. In the preparation of the hydroxy-functional polyester (meth) acrylates it is possible for a total of 7 groups of monomer constituents to be employed:

1. (Cyclo)alkanediols (i.e. dihydric alcohols having (cyclo)aliphatically attached hydroxyl groups) of the molecular weight range 62 to 286, such as ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as diethylene glycol, triethylene glycol, tetraethylene glycol, dipropylene glycol, tripropylene glycol, polyethylene glycols, polypropylene glycols or polybutylene glycols having a molecular weight of from 200 to 4000, preferably from 300 to 2000, with particular preference from 450 to 1200. Reaction products of the aforementioned diols with ε-caprolactone or with other lactones may likewise be employed as diols.

2. Alcohols with a functionality of three or more, from the molecular weight range from 92 to 254, such as glycerol, trimethylolpropane, pentaerythritol, dipentaerythritol and sorbitol or polyethers prepared starting from these alcohols, such as the reaction product of 1 mol of trimethylolpropane with 4 mol of ethylene oxide.

3. Monoalcohols such as ethanol, 1- and 2-propanol, 1- and 2-butanol, 1-hexanol, 2-ethylhexanol, cyclohexanol or benzyl alcohol.

4. Dicarboxylic acids from the molecular weight range from 104 to 600 and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecanedioic acid or hydrogenated dimer fatty acids.

5. Higher polyfunctional carboxylic acids or their anhydrides such as trimellitic acid and trimellitic anhydride.

6. Monocarboxylic acids, such as benzoic acid, cyclohexanecarboxylic acid, 2-ethylhexanoic acid, caproic acid, caprylic acid, capric acid, lauric acid, natural and synthetic fatty acids.

7. Acrylic acid, methacrylic acid and dimeric acrylic acid.

Hydroxyl-containing polyester (meth)acrylates contain the reaction product of at least one constituent from group 1 and/or 2 with at least one constituent from group 4 and/or 5 and at least one constituent from group 7.

Where appropriate, groups with a dispersing effect which are general knowledge from the prior art, as described, for example, in Progress in Organic Coatings, 9 (1981), 291–296, may also be incorporated into these polyester (meth)acrylates. For instance, as the alcohol component it is possible to use a proportion of polyethylene glycols and/or methoxypolyethylene glycols. As compounds, mention may be made, for example, of polyethylene glycols and polypropylene glycols prepared starting from alcohols, their block copolymers, and also the monomethyl ethers of these polyglycols. Preference is given to polyethylene glycol-1500 monomethyl ether and/or polyethylene glycol-500 monomethyl ether.

Furthermore, it is possible after the esterification to react a portion of carboxyl groups, preferably those of the (meth) acrylic acid, with mono-, di- or polyepoxides. Examples of preferred epoxides are the epoxides (glycidyl ethers) of monomeric, oligomeric or polymeric bisphenol A, bisphenol F, hexanediol and/or butanediol, or their ethoxylated and/or propoxylated derivatives. This reaction can be used in particular for raising the OH number of the polyester (meth) acrylate, since in the epoxide-acid reaction one OH group is formed in each case. The acid number of the resultant product lies between 0 and 20 mg KOH/g, preferably between 0 and 10 mg KOH/g and with particular preference between 0 and 5 mg/KOH/g.

The preparation of polyester (meth)acrylates is described in DE-A 40 40 290 (p. 3 line 25–p. 6 line 24), DE-A 33 16 592 (p. 5 line 14–p. 11 line 30) and P. K. T. Oldring (ed.), Chemistry & Technology of UV and EB Formulations For Coatings, Inks & Paints, Vol. 2, 1991, SITA Technology, London, pp. 123 to 135.

An alternative option is to use conventional hydroxyl-containing epoxy (meth)acrylates, hydroxyl-containing polyether (meth)acrylates or hydroxyl-containing polyurethane (meth)acrylates having OH contents of from 20 to 300 mg KOH/g, and also mixtures thereof with one another and mixtures with hydroxyl-containing unsaturated polyesters and also mixtures with polyester (meth)acrylates or mixtures of hydroxyl-containing unsaturated polyesters with polyester (meth)acrylates. Such compounds are likewise described in P. K. T. Oldring (ed.), Chemistry & Technology of UV and EB Formulations For Coatings, Inks & Paints, Vol. 2, 1991, SITA Technology, London. Hydroxyl-containing epoxy (meth)acrylates are based preferably on epoxides (glycidyl ethers) of monomeric, oligomeric or polymeric bisphenol A, bisphenol F, hexanediol and/or butanediol or the ethoxylated and/or propoxylated derivatives.

Polyurethane dispersions prepared using unsaturated (meth)acrylates as component (C) are suitable for crosslinking by high-energy radiation, e.g. by UV radiation. Polyurethane dispersions derived from unsaturated (meth) acrylates are described, for example, in EP-A 0 753 531 (p. 2 line 44–p. 6 line 49), EP-A 0 872 502 (p. 3 line 4–p. 12 line 19) and EP-A 0 942 022 (p. 4 line 18–p. 17 line 57).

Low molecular weight compounds containing anionic groups or capable of forming an ionic group are suitable as component (D), such as dimethylolpropionic acid, hydroxypivalic acid, reaction products of (meth)acrylic acid and polyamines (see, for example, DE-A-19 750 186, p. 2, lines 52–57) or sulphonate-functional polyol components such as the propoxylated adduct of sodium hydrogen sulphite with 2-butenediol, or the polyesters described in EP-A 0 364 331 (p. 6 lines 1–6), which are synthesized from salts of sulphoisophthalic acid. Also suitable are OH-functional compounds which contain cationic groups or units which can be converted into cationic groups, such as N-methyldiethanolamine, for example. Preference is given to hydroxypivalic acid and/or dimethylolpropionic acid.

Likewise suitable as component (D) is ethylenediamine-β-ethylsulphonic acid, as described in DE-A 4 236 569 (p. 5 lines 40–44), or sulphonate-functional diols as described in DE-A 2 446 440 (pp. 4–5).

Suitable components (E) include polyols, aminopolyols or polyamines having a molar weight of less than 500, which can be used as chain extenders, such as ethanediol, 1,4-butanediol, cyclohexanedimethanol, trimethylolpropane, glycerol and also hydrazine, ethylenediamine, 1,4-diaminobutane, isophoronediamine, 4,4-diaminodicyclohexylmethane, ethanolamine, dimethylethanolamine and N-methyldiethanolamine.

Besides the use of isocyanate-reactive polyfunctional compounds, the termination of the polyurethane prepolymer with monofunctional alcohols or amines (F) is also suitable. Preferred compounds (F) are aliphatic monoalcohols or monoamines having from 1 to 18 carbon atoms, particular preference being given to the use of ethanol, n-butanol, ethylene glycol monobutyl ether, 2-ethylhexanol, 1-octanol, 1-dodecanol, 1-hexadecanol or di-N-alkylamines.

Suitable as component (F) are likewise mono-hydroxy-functional esters of acrylic and/or methacrylic acid. Examples of such compounds are the mono(meth)acrylates of dihydric alcohols such as ethanediol, the isomeric propanediols and butanediols, or (meth)acrylates of polyhydric alcohols such as trimethylolpropane, glycerol and pentaerythritol, for example, which contain on average one free hydroxyl group. Dispersions derived from unsaturated (meth)acrylates are suitable for crosslinking by high-energy radiation, preferably by UV radiation.

The reaction mixtures of the invention may further comprise polyoxyalkylene ethers (G) which carry per molecule at least one hydroxyl or amino group and are composed, for example, of an alcohol and of polyethylene oxide and/or polypropylene-polyethylene oxide blocks having a molar weight of from 250 to about 3000. Given a sufficient proportion of these nonionically hydrophilic compounds it is also possible to dispense with a portion of ionically hydrophilic compounds in accordance with (D).

Suitable oxidatively drying components (H) include compounds which in addition to isocyanate-reactive groups contain on average from 1.5 to 2.5, preferably from 1.8 to 2.2 and with particular preference from 1.95 to 2.05 reactive groups, preferably hydroxyl groups, and which additionally contain, in the same molecule, drying and/or semi-drying residues of fatty acids (iii). By drying fatty acids (iii) are meant those which, at least applied as the triglyceride in the thin film to a non-absorbent substrate, dry to a solid film within 2 to 4 days. The iodine number of drying oils is higher than 170. Semi-drying fatty acids, or at least their triglycerides, likewise form a "solid" film, but take substantially longer to do so than drying oils. Their iodine number is situated within the range from 100 to 170.

Suitable fatty acids (iii) are those obtained from drying or semi-drying oils, such as linseed oil fatty acid, soya bean oil fatty acid, sunflower oil fatty acid, colza oil fatty acid and herring oil fatty acid. It is also possible to use distilled products, which for example contain predominantly (>60% by weight) linoleic acid, licanic acid, arachidonic acid, palmitoleic acid and/or linolenic acid. Preference is given to using those fatty acids (iii) which as far as the fatty acid residue is concerned correspond in their composition to the naturally occurring fatty acid mixtures as may be obtained from vegetable or animal oils, e.g. soya bean oil, tallow oil, linseed oil or sunflower oil. The fatty acid residue may also contain further functional groups which are inert toward isocyanates at between 0° C. and 100° C.

Component (H), depending on the fatty acid (iii) used, contains proportionally two or more isolated and/or conjugated double bonds. Preferred compounds (H) here are fatty acid diethanolamides, which are obtained by reacting N,N-dialkanolamines (ii) of the formula (I) with fatty acids (iii) or derivatives thereof, such as fatty acid esters or fatty acid chlorides. By fatty acid derivatives are meant those derivatives in which the OH group of the carboxylic acid group is being replaced, for example, by —Cl or —OR", where R" has from 1 to 4 carbon atoms and the fatty acid derivatives are reactive towards amines.

Examples of compounds of the formula (I) are 2-[(2-hydroxyethyl)amino]-2-methylpropan-1-ol, 1-(2-hydroxyamino)-2-propanol or N-2-hydroxyethyl-norephedrines, bis(2-hydroxyethyl)amine, bis(2-hydroxypropyl)amine, 1,1'-dimethyl-1-1'-dipropyl-2,2'-iminodiethanol and 3,3'-diallyloxy-2,2'-dihydroxydipropylamine. Preferred dialkoanolamines (ii) of the formula (I) are those which have identical alkyl radicals R and R', such as bis(2-hydroxyethyl)amine, bis(2-hydroxypropyl)amine, 1,1'-dimethyl-1-1'-dipropyl-2,2'-iminodiethanol and 3,3'-diallyloxy-2,2'-dihydroxydipropylamine. Particular preference is given to bis(2-hydroxyethyl)amine.

Component (H) likewise preferably comprises partially dehydrated castor oil, which is obtained by subjecting castor oil to heat with acidic catalysis and is described in EP-A 0 709 414 (p. 2, lines 37–40).

Additionally, products comprising as component (H) one or more esterification or transesterification product(s) of semi-drying and/or drying fatty acids and/or oils (iii) with polyol compounds having a functionality of at least two are also suitable. Transesterification products of this kind are described in EP-A 0 017 199 (p. 10, line 27 to p. 11 line 31). As polyol compounds it is preferred to use trifunctional and terta-functional hydroxyl components such as trimethylolethane, trimethlyolpropane, glycerol or pentaerythritol. Besides the unsaturated fatty acids (iii) already mentioned, ricinoleic acid, for example, is also suitable.

EP-A 0 640 632 (p. 2 lines 50–58 and p. 3 lines 10–14) describes further suitable products containing fatty acid. They are obtained by esterifying fatty acids (iii) from drying and/or semi-drying oils with polyols. The components (H) employed for preparing the polyurethanes contain predominantly (i.e. >50% by weight) two hydroxyl groups per fatty-acid-containing molecule and are obtained by distillation of the crude mixture obtained in the transesterification. As examples of such fatty acids (iii) mention may be made of linoleic acid, licanic acid, arachidonic acid, palmitoleic acid and/or linolenic acid, preferably those which comprise fatty acid mixtures from vegetable or animal oils, e.g. soya bean oil, tallow oil, linseed oil or sunflower oil, which are transesterified with polyols such as trimethylolethane, trimethlyolpropane, glycerol or pentaerythritol, for example. Preference is given to transesterification products of drying and/or semi-drying oils such as dehydrogenated castor oil, sunflower oil, soya bean oil, linseed oil, tallow oil, olive oil or mixtures of these with trimethylolethane, trimethlyolpropane, glycerol or pentaerythritol.

Preferred components (H) are those described in DE-A 199 30 961 (p. 2 lines 46–54; p. 2 line 67 to p. 3 line 3). There, aliphatic and cycloaliphatic monocarboxylic acids having from 8 to 30 carbon atoms such as oleic acid, lauric acid, linoleic acid or linolenic acid, for example, are reacted with castor oil in the presence of glycerol. Preferred fatty acids (iii) are those which comprise fatty acid mixtures (iii) which can be obtained from vegetable or animal oils such as soya bean oil, tallow oil, linseed oil, sunflower oil or olive oil, for example.

With particular preference, component (H) is obtained by transesterifying castor oil and one or more triglycerides having an iodine number of greater than 100, as is likewise described in DE-A 199 30 961 (p. 3, lines 42–52, p. 4; Examples Precursor 1 and Precursor 2). Mixtures of the components (H) listed are likewise suitable.

The polymer product of the invention can be prepared by reacting components (A), (C) (D), (E) and also, where appropriate, (F) and (G) or (A), (C), (D), (E), (F), (G) and (H) separately and in any order or as a mixture with component(s) (B). Ideally, amino-functional components (E), (F) and/or (G) are only added when the reactivity towards isocyanates is moderate and thus does not lead to gelling of the batch. A controlled reaction between isocyanates and amines is achieved when, in the manner known to the person skilled in the art, the reaction are carried out in a sufficient amount of solvent, which can later be distilled off again if desired, as in the case of the acetone process, or the amines have a reduced reactivity, as in the case, for example, of aspartic esters, which are described fundamentally in EP-A 0 403 921.

It is possible here to introduce either component (B) or else one or more of components (A) and (C-G) or (C-H) as initial charge. Preferably, component (A) is introduced initially, together with components (C-G) and, where appropriate, component (H) as well, and this initial charge is then reacted with component (B). If desired, a solvent or solvent mixture is used in order to reduce the viscosity of the resin mixture and/or to attenuate the reactivity of certain isocyanate-reactive compounds, especially N-H-functional components, through the dilution effect. The solvent can be distilled off again later.

Suitable solvents are the customary paint solvents known per se, such as ethyl acetate, butyl acetate, ethylene glycol monomethyl or monoethyl ether acetate, 1-methoxypropyl 2-acetate, 3-methoxy-n-butyl acetate, acetone, 2-butanone, 4-methyl-2-pentanone, methyl ethyl ketone, cyclohexanone, toluene, xylene, chlorobenzene, white spirit, mixtures containing, in particular, aromatics with relatively high degrees of substitution, such as are available commercially under the designations Solvent Naphtha, Solvesso® (Deutsche Exxon, Cologne, DE), Cypar® (Shell Eschborn, DE), Cyclo Sol® (Shell Eschborn, DE), Tolu Sol® (Shell Eschborn, DE), Shellsol® (Shell, Eschborn, DE), carbonic esters, such as dimethyl carbonate, diethyl carbonate, 1,2-ethylene carbonate and 1,2-propylene carbonate, lactones, such as β-propiolactone, γ-butyrolactone, ε-caprolactone and ε-methylcaprolactone, but also solvents such as propylene glycol diacetate, diethylene glycol dimethyl ether, diethylene glycol ethyl ether acetate, diethylene glycol butyl ether acetate and N-methylcaprolactam or any desired mixtures of such solvents. Preferred solvents are N-methylpyrrolidone and also dipropylene glycol dimethyl ether.

In a further step, groups capable of neutralization are converted into the salt form and a dispersion is produced by adding water to the polymer resin or by adding the polymer resin to the water. It is, however, also possible to use hydrophilic components (D) which are already in salt form when adding to the polyurethane prepolymer, such as are used, for example, in the preparation of polyurethane dispersions by the acetone process.

Suitable neutralizing agents are alkaline organic and/or alkaline inorganic compounds. Preference is given, besides aqueous ammonia solution, ethylamine solution and dimethylamine solution, to volatile primary, secondary and tertiary amines, such as, for example, dimethylethanolamine, morpholine, N-methylmorpholine, piperidine, diethanolamine, triethanolamine, diisopropylamine, 2-amino-2-methylpropanol and 2-N,N-dimethylamino-2-methylpropanol or mixtures of these compounds. Particular preference is given to tertiary amines which are unreactive towards isocyanates, such as triethylamine, diisopropylethylamine and N-methylmorpholine, for example. Mixtures of neutralizing amines are likewise suitable.

Alternatively, the neutralization of the polyurethane/polyurethane prepolymer may be induced only in the water phase, by adding to the water used for dispersion a sufficient amount of a component capable of forming a salt with the component (D) incorporated in the polymer/prepolymer. Depending on the degree of neutralization the dispersion may be made very fine, so that it has virtually the appearance of a solution; however, very coarse formulations are also possible, and likewise possess sufficient stability. The solids content as well may be varied within wide limits of, for example, from 20 to 65%. A preferred solids range extends from 35 to 55%. Particular preference is given to a solids content of from 38 to 45% by weight.

Excess isocyanate groups are subsequently reactive by reaction with polyfunctional isocyanate-reactive compounds (E) (chain extension). For this purpose it is preferred to use polyamines and particularly preferred to use primary or secondary diamines and triamines and hydrazine (component (E)).

Also suitable is termination with a monoamine (F) such as diethylamine, dibutylamine, ethanolamine, N-methylethanolamine or N,N-diethanolamine, for example.

The amount of the nitrogen-containing, isocyanate-reactive component(s) (E and/or F and/or G), preferably of a polyfunctional component (E) or a mixture of polyfunctional components (E), is calculated such that from 45 to 105%, with particular preference from 55 to 90%, of the isocyanate groups are theoretically consumed by reaction. The remaining isocyanate groups react with attendant water, a reaction accompanied by chain extension.

For the preparation of coating compositions the polyurethane dispersions of the invention are used either alone or in combination with other aqueous binders. Such aqueous binders may be synthesized, for example, from polyester polymers, polyacrylate, polyepoxide polymers or polyurethane polymers. Combination with radiation-curable aqueous binders is a further possibility. It is also possible to polymerize polymerizable monomers containing vinylic unsaturation in the presence of the polyurethane dispersions of the invention, in order to give hybrid dispersions. For this purpose an emulsion polymerization of olefinically unsaturated monomers such as esters and/or amides of (meth) acrylic acid and alcohols having from 1 to 18 carbon atoms, styrene, vinyl esters or butadiene is carried out in the presence of the polyurethane dispersion. The monomers may contain functional groups such as hydroxyl or acetoacetoxy groups and also one or more olefinic double bonds.

Furthermore, it is possible to add crosslinkers before applying the coating composition comprising the polyurethane dispersion of the invention. Suitable for this purpose, preferably, are hydrophilic and hydrophobic polyisocyanate crosslinkers.

The polyurethanes dispersions of the invention are used preferably as binders in coatings and adhesives. Coatings based on the polyurethane dispersions of the invention may be applied to any substrates, examples being wood, metal, plastic, paper, leather, textiles, felt, glass or mineral substrates, and also to substrates which have already been coated. One particularly preferred application is the coating of wood floors and synthetic floors, and also mineral floors.

The polyurethane dispersions of the invention can be used as such or in combination with the auxiliaries and additives known from coatings technology, such as fillers, pigments, solvents, levelling assistants, for example, to produce coatings. In order to accelerate oxidative crosslinking it is possible to add siccatives. In accordance with one further embodiment of the invention, the dispersions of the invention are used with the addition of one or more known photoinitiators in UV-curing coatings. As compared with the UV-curing coating materials of the prior art, such coatings are notable for particular properties of touch. Examples of suitable photo-initiators include aromatic ketone compounds, such as benzophenones, alkylbenzophenones, 4,4'-bis(dimethylamino)benzo-phenone (known as Michler's ketone), anthrone and halogenated benzophenones. Also suitable are acylphosphine oxides, e.g. 2,4,6-trimethylbenzoyl-diphenylphosphine oxide, phenylglyoxylic esters, anthraquinone and its derivatives, benzile ketals and hydroxyalkyl-phenones. It is also possible to use mixtures of these compounds. They are customarily used in amounts of from 0.1 to 10% by weight, preferably from 0.5 to 5% by weight.

The coating compositions comprising the polyurethane dispersion of the invention may be applied conventionally, for example by brushing, pouring, knife coating, squirting, spraying (Vakumat), spinning, rolling or dipping. The coating film may be dried at room temperature or an elevated temperature, or else dried by baking at up to 200° C. Where UV-curing constituents are present in the dispersions of the invention, the drying operation may further include irradiation with UV light. It is preferred to remove first water and any other solvent from the coating by known methods, then to carry out irradiation with UV light, and finally, where appropriate, to carry out further drying or curing.

The invention is further illustrated but is not intended to be limited by the following examples in which all parts and percentages are by weight unless otherwise specified.

EXAMPLES

TABLE 1

Components employed

| Trade name | Identification | Manufacturer |
|---|---|---|
| Arcol ® PPG 1000 | Polypropylene glycol, F* = 2, MW ≈ 1000 g/mol | Bayer AG, Leverkusen, DE |
| Rewomid ® DC 212 S | Coconut oil fatty acid diethanolamide | Tego Chemie, Essen, DE |
| Desmodur ® W | 4,4'-Diisocyanatodicyclohexyl-methane, trans-trans content approximately 20% by weight | Bayer AG, Leverkusen, DE |
| Desmophen ® C 200 | Polyester carbonate, F = 2, MW ≈ 2000 g/mol | Bayer AG, Leverkusen, DE |
| Proglyde ® DMM | Dipropylene glycol dimethyl ether | Dow Chemicals, Schwalbach, DE |
| PolyTHF ® | Polytetramethylene glycol, F = 2, MW ≈ 2000 g/mol | BASF AG, Ludwigshafen, DE |
| Byk ® 028 | Defoamer | Byk Chemie, Wesel, DE |

TABLE 1-continued

Components employed

| Trade name | Identification | Manufacturer |
|---|---|---|
| Byk ® 024 | Defoamer | Byk Chemie, Wesel, DE |
| Byk ® 346 | Wetting agent | Byk Chemie, Wesel, DE |
| Kronos ® 2190 | Titanium dioxide | KerrMcGee, Krefeld, DE |
| Tafigel ® PUR 50 | Thickener | Munzing Chemie, Heilbronn, DE |
| Disperbyk ® 190 | Dispersing aid | Byk Chemie, Wesel, DE |
| Tego ® Foamex 805 | Defoamer | Tego Chemie, Essen, DE |
| Acrysol ® RM8 | Thickener, 5% in water | Rohm&Haas, Frankfurt, DE |
| Laromer ® PE 44F | Polyester acrylate | BASF AG, Ludwigshafen, DE |
| Desmodur ® I | Isophorone diisocyanate | Bayer AG, Leverkusen, DE |
| Desmodur ® H | Hexamethylene diisocyanate | Bayer AG, Leverkusen, DE |
| Irgacure ® 500 | Photoinitiator | Ciba Spez.chemie, Lampertheim, DE |

F* = Functionality with respect to isocyanates

Polyester-oligomer Precursor

A 5 l reactor with top-mounted distillation attachment is charged with 3200 g of castor oil and 1600 g of soya oil and also with 2.4 g of dibutyltin oxide. A stream of nitrogen (5 l/h) is passed through the reactants. Heating to 240° C. is carried out over the course of 140 minutes. After 7 hours at 240° C., the batch is cooled. The OH is 89 mg KOH/g, the acid number 2.5 mg KOH/g.

PU Dispersion 1

90.5 g of Arcol® PPG 1000, 265.2 g of polyester-oligomer precursor, 57.4 g of dimethylolpropionic acid, 36.7 g of 1,6-hexanediol, 26.4 g of Rewomid® DC 212S and 146.8 g of N-methylpyrrolidone are heated to 70° C. and stirred until a clear solution has formed. Then 514.8 g of Desmodur® W are added and the mixture is heated to 100° C. It is stirred at this temperature until the NCO content is 5.9%. Then it is cooled to 70° C. and 30.3 g of triethylamine are added. 500 g of the dispersion are dispersed with vigorous stirring in 650 g of water, which is introduced initially at a temperature of 30° C. Dispersion is followed by 5 minutes of subsequent stirring. Then a solution of 6.2 g of hydrazine hydrate and 10.2 g of ethylenediamine in 100 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size: (Laser correlation spectroscopy, LCS) | 48 nm |
|---|---|
| pH (20° C.): | 7.4 |
| Solids content: | 36.0% |

PU Dispersion 2

340.8 g of Desmophen® C 200, 33.0 g of dimethylolpropionic acid, 62.0 g of neopentyl glycol, 1.9 g of butyl glycol, 18.2 g of Rewomid® DC 212 S (fatty acid diethanolamide of coconut oil fatty acid, free amine [MW=105] max. 5%, free fatty acid [MW=200] max. 0.6%, ester content max. 6%) and 241.1 g of N-methylpyrrolidone are heated to 70° C. and stirred until a clear solution has formed. Then 407.0 g of Desmodur® W are added and the mixture is heated to 100° C. It is stirred at this temperature until the NCO content is 3.6%. Then it is cooled to 70° C. and 24.8 g of triethylamine are added. 900 g of this solution are dispersed with vigorous stirring in 957 g of water, which is introduced initially at a temperature of 30° C. Dispersion is followed by 5 minutes of subsequent stirring. Then a solution of 9.3 g of hydrazine hydrate and 8.2 g of ethylenediamine in 100 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size (LCS): | 49 nm |
|---|---|
| pH (20° C.): | 8.2 |
| Solids content: | 38% |

PU Dispersion 3

90.5 g of PolyTHF® 2000, 31.4 g of dimethylolpropionic acid, 132.6 g of the polyester-oligomer precursor, 18.3 g of 1,6-hexanediol, 13.2 g of Rewomid® DC 212 S and 80.5 g of N-methylpyrrolidone are heated to 70° C. and stirred until a clear solution has formed. Then 257.4 g of Desmodur® W are added and the mixture is heated to 100° C. It is stirred at this temperature until the NCO content is 5.0%. Then it is cooled to 70° C. and 16.5 g of triethylamine are added. 400 g of this solution are dispersed with vigorous stirring in 510.0 g of water, which is introduced initially at a temperature of 30° C. Dispersion is followed by 5 minutes of subsequent stirring. Then a solution of 4.8 g of hydrazine hydrate and 7.7 g of ethylenediamine in 59.4 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size (LCS): | 55 nm |
|---|---|
| pH (20° C.): | 7.6 |
| Solids content: | 38.5% |

Comparative Example 1

59.7 g of Arcol® PPG 1000, 145.9 g of polyester-oligomer precursor, 31.5 g of dimethylolpropionic acid, 24.9 g of 1,6-hexanediol and 80.8 g of N-methylpyrrolidone are heated to 70° C. and stirred until a clear solution has formed. Then 283.2 g of Desmodur® W are added and the mixture is heated to 100° C. It is stirred at this temperature until the NCO content is 5.9%. Then it is cooled to 70° C. and 16.6 g of triethylamine are added. 500 g of this solution are dispersed with vigorous stirring in 650 g of water, which is introduced initially at a temperature of 30° C. Dispersion is followed by 5 minutes of subsequent stirring. Then a solution of 7.0 g of hydrazine hydrate and 11.3 g of ethylenediamine in 100 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size (LCS): | 52 nm |
|---|---|
| pH (20° C.): | 7.6 |
| Solids content: | 35.7% |

Comparative Example 2

339 g of PolyTHF® 2000, 248 g of the polyester-oligomer precursor, 70 g of dimethylolpropionic acid, 34 g of 1,6-hexanediol and 186 g of N-methylpyrrolidone are heated to 70° C. and stirred until a clear solution has formed. Then 516 g of Desmodur® W are added and the mixture is heated to 100° C. It is stirred at this temperature until the NCO content is 4.6%. Then it is cooled to 70° C. and 39 g of triethylamine are added. 500 g of this solution are dispersed with vigorous stirring in 640 g of water, which is introduced initially at a temperature of 30° C. Dispersion is followed by 5 minutes of subsequent stirring. Then a solution of 4.1 g of hydrazine hydrate and 10.2 g of ethylenediamine in 100 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size (LCS): | 45 nm |
|---|---|
| pH (20° C.): | 8.4 |
| Solids content: | 35.0% |

Comparative Example 3

204.5 g of Desmophen® C 200, 19.8 g of dimethylolpropionic acid, 47.9 g of neopentyl glycol, 1.2 g of butyl glycol and 147.7 g of N-methyl-pyrrolidone are heated to 70° C. and stirred until a clear solution has formed. Then 244.2 g of Desmodur® W are added and the mixture is heated to 100° C. It is stirred at this temperature until the NCO content is 2.7%. Then it is cooled to 70° C. and 14.9 g of triethylamine are added. 500 g of this solution are dispersed with vigorous stirring in 543.5 g of water, which is introduced initially at a temperature of 30° C. Dispersion is followed by 5 minutes of subsequent stirring. Then a solution of 4.0 g of hydrazine hydrate and 3.5 g of ethylenediamine in 60 g of water is added over the course of 5 minutes. For complete reaction of the isocyanate groups, the mixture is stirred at 45° C. until NCO can no longer be detected by IR spectroscopy. After cooling to 30° C., the product is filtered through a Seitz T5500 filter.

Key data of the polyurethane dispersion:

| Average particle size (LCS): | 50 nm |
|---|---|
| pH (20° C.): | 7.8 |
| Solids content: | 35.4% |

Testing as Parquet Lacquer

Formulation of pigmented lacquers from Polyurethane Dispersion 1 and from Comparative Examples 1 and 2:

To formulate a pigmented lacquer, the following formulation constituents are added in each case to 60.5 parts by weight of the dispersions: 3.0 parts by weight of Proglyde® DMM, 1.0 part by weight of Byk® 028, 0.2 part by weight of Byk® 24, 0.7 part by weight of Byk® 346 and 3.4 parts by weight of Tafigel® PUR 50 (1:1 in water) and this composition is intimately mixed with a mixture of 8.8 parts by weight of water, 0.2 part by weight of 2-amino-2-methyl-1-propanol, 1.7 parts by weight of Disperbyk® 190 and 20.3 parts by weight of Kronos® 2190.

To determine the film hardness (pendulum damping according to DIN 53 157) and the gloss values at the 60° angle (measured using a "HAZE GLOSS" laboratory reflectometer from Byk Gardener) the lacquers are applied with a wet film thickness of 200 µm to glass plates. The pendulum hardness is assessed for drawdowns on glass and the gloss is assessed for both drawdowns on glass and on gloss charts (gloss charts from BYK-Gardener, test chart number 2853) (see Table 2).

TABLE 2

Gloss and pendulum hardener

|  | Ex. 1 | Comp. Ex. 1 | Comp. Ex. 2 |
|---|---|---|---|
| Pendulum hardness after 2 d | 105 | 65 | 63 |
| Pendulum hardness after 5 d | 105 | 65 | 63 |
| Pendulum hardness after 7 d | 110 | 66 | 66 |
| Gloss 60° glass | 79 | 67 | 71 |
| Gloss 60° chart | 78 | 67 | 69 |

To determine the resistances to water and ethanol (50% strength aqueous solution), clearcoat materials are applied in 3 coats (each 100 g lacquer/m²) to oak wood panels, then dried in each case at room temperature. Before application of the 2nd and 3rd coats the lacquer surface is slightly sanded.

To formulate the clearcoat material, the following formulation constituents are added in each case to 100 parts by weight of the dispersions:

| | |
|---|---|
| Cosolvent: | Butyl glycol/water 1:1 (10 parts by weight) |
| Defoamer: | Tego Foamex ® 805, supply form (0.2 part by weight) |
| Wetting agent: | Byk ® 346, supply form (0.5 part by weight) |
| Thickener: | Acrysol ® RM8, 5% in water (1.0 part by weight) |

Resistances to water and ethanol are determined by the following method:

Cotton pads soaked with the solvent are applied to lacquer films 7 days old, and are covered with Petri dishes. After exposure times of 24 hours (water) or 30 minutes (ethanol) assessment takes place, after the wetted films have been carefully dried using a paper kitchen towel. Damage is assessed on a scale from 0 (no change) to 5 (severe damage, film dissolved).

The heelmark resistance is assessed by hitting the surface of the film with a standard commercial replacement sole. An assessment is made of the softening of the lacquer film, or heelmark resistance, on a scale from 0 to 4:

To determine the film hardness (pendulum damping according to DIN 53 157) and the abrasion resistance (according to DIN 53754; Taber Abraser, CS 10/1 kg/1000 revs.) the lacquers are applied with a wet film thickness of 200 µm to glass plates.

TABLE 3

Assessment of film hardness and abrasion resistance

| Value | Softening | Heelmark resistance |
|---|---|---|
| 0 | Unchanged | Unchanged |
| 1 | Very slight | Slight trace perceptible |
| 2 | Somewhat more severe | Slight scratches visible |
| 3 | Can be damaged slightly with fingernail | Scratches clearly visible |
| 4 | Can be wiped away | Surface burnt in |

TABLE 4

Test results for film hardness and abrasion resistance

|  | Ex. 1 | Ex. 3 | Comp. Ex. 1 | Comp. Ex. 2 |
|---|---|---|---|---|
| Water resistance 24 h | 0 | 0 | 0 | 0 |
| Ethanol/water 5 min | 1 | 1 | 1 | 1 |
| Ethanol/water 30 min | 1 | 2 | 1 | 1 |
| Abrasion [mg] | 30 | 22 | 26 | 18 |
| Pendulum hardness | 124 | 112 | 106 | 70 |
| Heelmark resistance | 2 | 2 | 2–3 | 2 |

The test results show the comparatively good heelmark resistance of the inventive PU Dispersions 1 and 3 in association with high hardness and relatively low abrasion.

PU Dispersion 4 (Inventive, UV-curing)

A 2 l reaction vessel with stirrer, internal thermometer and gas inlet (airflow 2 to 3 l/h) is charged with 334.0 g of the polyester acrylate Laromer® PE 44F, OH content approximately 80 mg KOH/g, and with 7.80 g of neopentyl glycol, 22.0 g of Rewomid® DC 212 S, 26.8 g of dimethylolpropionic acid, 0.6 g of dibutyltin dilaurate and 147.5 g of acetone, 101.5 g of Desmodur® I and 51.5 g of Desmodur® H are added, and the mixture is heated in such a way that there is constant reflux of acetone. Stirring is continued at this temperature until the reaction mixture contains an NCO content of 1.8% by weight. It is then cooled to 40, C and 16.2 g of triethylamine are added rapidly. After 10 minutes the reaction mixture is poured into 933.0 g of water at 18° C., with rapid stirring. After the dispersion has formed, 9.5 g of ethylenediamine in 30.0 g of water are added. After 30 minutes of subsequent stirring without heating or cooling, the product is distilled in vacuo (50 mbar, max. 50° C.) until a solids content of 39.5% by weight is reached. The viscosity of the dispersion was 16.2 s efflux time in the DIN 4 cup.

Key data of the polyurethane dispersion:

| | |
|---|---|
| Average particle size (LCS): | 125 nm |
| pH (20° C.): | 8.1 |

1.5% by weight of Irgacure® 500 are stirred into one part of the PU Dispersion 4, calculated on the basis of the dispersion's solids content.

After overnight standing the dispersion is drawn down onto a glass plate using a 150 µm bone doctor blade. The coated glass plate is stored at room temperature for 45 minutes. A clear, transparent, dry-to-the-touch film is formed. The coated glass plate is subsequently moved at a speed of 5 m/min beneath a high pressure mercury lamp (output 80 W/cm lamp length). A hard film with a pleasantly soft touch is produced.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous polyurethane dispersions prepared by dispersing a polymer resin in water, wherein the polymer resin is prepared by reacting a reaction mixture comprising:
   A) at least one condensation product of (i) an oxidatively non-drying fatty acid and (ii) a dialkanolamine and having a number average molecular weight of <500,
   B) one or more polyisocyanates,
   C) one or more hydrophobic, water immiscible polyols having a number average molar weight of from 500 to 6000 and containing no functional groups being capable of oxidative drying,
   D) one or more compounds which contain an ionic group or a group capable of forming an ionic group, and
   E) one or more polyols and/or polyamines having a number average molecular weight of <500,
   F) optionally, monoalcohols and/or monoamines and
   G) optionally OH- and/or NH-functional, nonionically hydrophilic polyoxyalkylene ethers.

2. The aqueous polyurethane dispersion of claim 1, wherein component (i) is selected from the group consisting of behenic acid, arachidic acid, oleic acid, stearic acid, palmitic acid, coconut oil fatty acid, groundnut oil fatty acid, olive kernel oil fatty acid, olive oil fatty acid, almond oil acid, kapok oil acid, hazelnut oil acid, apricot kernel oil acid, palm kernel oil fatty acid, palm oil fatty acid and mixtures thereof.

3. The aqueous polyurethane dispersion of claim 2, wherein said dialkanolamine is a compound of the general formula (I)

$$HO-R-NH-R'-OH \quad (I)$$

wherein R and R' stand for identical or different $C_2$–$C_9$ alkyl and/or aralkyl radicals.

4. The aqueous polyurethane dispersion of claim 1, wherein said reaction mixture additionally comprises component (H) which in addition to at least one group capable of oxidative drying contains at least one isocyanate-reactive group.

5. The aqueous polyurethane dispersion of claim 4, wherein component (H) in addition to isocyanate-reactive groups contains on average from 1.5 to 2.5 reactive groups and additionally contains, in the same molecule, drying and/or semi-drying residues of fatty acids (iii).

6. The aqueous polyurethane dispersion of claim 5, wherein the fatty acid (iii) is selected from the group consisting of linseed oil fatty acid, soya bean oil fatty acid, sunflower oil fatty acid, colza oil fatty acid, herring oil fatty acid, linoleic acid, licanic acid, arachidonic acid, palmitoleic acid, linolenic acid, and mixtures thereof.

7. The aqueous polyurethane dispersion of claim 4, wherein component (H) is a fatty acid diethanolamide obtained by reacting (ii) N,N-diethanolamine with (iii) fatty acids or derivatives thereof.

8. The aqueous polyurethane dispersion of claim 4, wherein component (H) is partially dehydrated castor oil.

9. The aqueous polyurethane dispersion of claim 4, wherein component (H) is one or more esterification or transesterification product(s) of semi-drying and/or drying fatty acids (iii) with polyol compounds having a functionality of at least two.

10. The aqueous polyurethane dispersion of claim 4, wherein component (H) is a reaction product of aliphatic and/or cycloaliphatic monocarboxylic acids having from 8 to 30 carbon atoms, castor oil and glycerol.

11. The aqueous polyurethane dispersion of claim 4, wherein component (H) is a transesterification product of castor oil and one or more triglycerides having an iodine number of greater than 100.

12. The aqueous polyurethane dispersion of claim 1, wherein the reaction mixture comprises:
   from 0.5 to 30% by weight of component (A),
   from 5 to 60% by weight of component (B),
   from 0.5 to 65% by weight of component (C),
   from 0.5 to 15% by weight of component (D),
   from 0.5 to 18% by weight of component (E),
   from 0 to 10% by weight of component (F), and
   from 0 to 10% by weight of component (G),
   the percentages being based on the weight of the resin solids and adding up to 100% by weight.

13. The aqueous polyurethane dispersion of claim 4, wherein said reaction mixture comprises:
   from 0.5 to 20% by weight of component (A),
   from 5 to 60% by weight of component (B),
   from 0.5 to 20% by weight of component (C),
   from 0.5 to 10% by weight of component (D),
   from 0.5 to 20% by weight of component (E),
   from 0 to 10% by weight of component (F),
   from 0 to 10% by weight of component (G) and
   from 5 to 35% by weight of a component (H),
   the percentages being based on the weight of the resin solids and adding up to 100% by weight.

14. The aqueous polyurethane dispersion of claim 1, wherein component (A) is a condensation product of coconut oil fatty acid and bis(2-hydroxyethyl)amine and/or of oleic acid and bis(2-hydroxyethyl)amine.

15. The aqueous polyurethane dispersion of claim 1, wherein
   component (B) is selected from the group consisting of tetramethylene diisocyanate, hexamethylene diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetra-methyl-m- or -p-xylylene diisocyanate, 1-isocyanato-3,3,5-trimethyl-5-isocyanatomethylcyclohexane (isophorone diisocyanate), 4,4'-diisocyanatodicyclohexylmethane and mixtures thereof.

16. The aqueous polyurethane dispersion of claim 1, wherein
   component C) is a polymeric polyol having a molecular weight of from 500 to 6000 and having an OH functionality of from 1.8 to 5.

17. The aqueous polyurethane dispersion of claim 1, wherein
   component C) contains acrylic ester and/or methacrylic ester units.

18. The aqueous polyurethane dispersion of claim 17, wherein
   component C) is a hydroxyl-containing polyester (meth)acrylate having an OH number of from 30 to 300 mg KOH/g.

19. The aqueous polyurethane dispersion of claim 1, wherein
   component D) is selected from the group consisting of dimethylolpropionic acid, hydroxypivalic acid, a reaction product of (meth)acrylic acid and polyamines and a sulphonate-functional polyol.

20. An aqueous coating composition comprising the aqueous polyurethane dispersions of claim 1.

* * * * *